United States Patent [19]

Cook et al.

[11] Patent Number: 4,688,757

[45] Date of Patent: Aug. 25, 1987

[54] SOFT SEAT Y PATTERN GLOBE VALVE

[75] Inventors: Lanny D. Cook, Provencal; George W. Parker, Dry Prong, both of La.

[73] Assignee: Dresser Industries, Inc., Dallas, Tex.

[21] Appl. No.: 895,076

[22] Filed: Aug. 11, 1986

[51] Int. Cl.[4] .............................................. F16K 1/44
[52] U.S. Cl. .................................... 251/210; 251/332
[58] Field of Search ................... 137/516.29; 251/210, 251/332

[56] References Cited

U.S. PATENT DOCUMENTS

| | | |
|---|---|---|
| 75,670 | 3/1868 | Douglas . |
| 2,403,028 | 7/1946 | Smith .................................. 251/210 |
| 2,595,012 | 4/1952 | Smith . |
| 2,936,154 | 5/1960 | Von Platen et al. . |
| 3,084,903 | 4/1963 | Parks . |
| 3,549,121 | 12/1970 | Mercier . |
| 3,960,364 | 6/1976 | Hargrave . |
| 4,076,212 | 2/1978 | Leman . |
| 4,228,987 | 10/1980 | Potter . |

FOREIGN PATENT DOCUMENTS

| | | | |
|---|---|---|---|
| 862536 | 3/1961 | United Kingdom ................ 251/210 |
| 442342 | 2/1973 | U.S.S.R. .............................. 251/210 |

Primary Examiner—Robert G. Nilson

[57] ABSTRACT

A globe valve (10) is disclosed which reduces the pressure drop across a soft seal (38) as it moves into and out of engagement with a seal surface (24) on the valve body (12) to reduce the wear effect of the pressure drop, particularly in control of gas flow with maximum pressures of approximately 6000 psi. A hard seal (28) is resiliently mounted on the valve stem (20) to engage the valve seal surface of the valve body prior to engagement of the soft seal to reduce the pressure drop across the soft seal.

6 Claims, 3 Drawing Figures

SOFT SEAT Y PATTERN GLOBE VALVE

TECHNICAL FIELD

This invention relates to valve closure seals, and in particular to valves employed in high pressure gas operation with maximum pressures of approximately 6000 psi.

BACKGROUND ART

The use of valving to control fluid flow has countless applications. One type of common line valve is the Y pattern globe valve which has an inlet passage, an outlet passage and a control stem passage containing the valve stem movable within the body of the valve with the passages generally intersecting in a Y pattern. The movable valve stem will typically have sealing structure which moves into sealing engagement with a portion of the valve body to stop flow between the inlet and outlet passages when the valve is to be closed. The valve stem can be retracted to permit flow between the inlet and outlet passages to open the valve.

A large number of valves, including the Y pattern globe valve, employ soft seals to act between a valve stem and valve body seat. In high pressure applications, particularly in flow of high pressure gas in the 6000 psi range, as the valve stem moves toward the valve body seat, the soft seal typically is extruded outward and under the retaining element retaining the soft seal on the valve stem. This extrusion causes small amounts of the soft seal to be sheared off with each open and close cycle. This shearing activity reduces the volume of the seal over time, which can result in leaking due to improper contact with the valve body seat, and even a seal blowout.

A need exists to develop a valve having a seal which is not extruded during each cycle of the valve between the open and closed position. This need becomes particularly acute when the valve is in a high pressure gas line having maximum pressures of approximately 6000 psi and above.

SUMMARY OF THE INVENTION

In accordance with one aspect of the present invention, a valve for controlling fluid flow is provided. The valve incorporates a first member defining a seal surface lying in a first plane. A second member is also provided which has a rigid end surface lying in a second plane. A hard seal is resiliently mounted to the second member and defines a hard seal surface lying in a third plane. A soft seal is mounted on the second member and defines a soft seal surface lying in a fourth plane positioned between the second and third planes. Structure is provided for forming a fluid flow path between the members. Other structure supports the members with each of the planes parallel and provides selective movement of one of the members relative to the other between an open position, with the members spaced apart to permit fluid flow along the fluid flow path, and a closed position blocking the fluid flow path. As the members move relative each other toward the closed position, the hard seal surface of the hard seal initially contacts the seal surface on the first member to block the flow sufficiently to reduce the fluid pressure drop and prevent extrusion of the soft seal as the continued relative movement of the members moves the seal surface of the soft seal into contact with the seal surface of the first member. The soft seal forms against the seal surface of the first member as the members move to the closed position to form a seal blocking fluid flow, the end surface of the second member mating with the seal surface of the first member in the closed position to limit compression of the soft seal.

In accordance with another aspect of the present invention, the first member is defined by the body of a globe valve and the seal surface forms an annular seal surface concentric with the axis of movement of the valve stem. The second member is mounted at the end of the valve stem.

BRIEF DESCRIPTION OF THE DRAWINGS

A more complete understanding of the invention and its advantages will be apparent from the Detailed Description taken in conjunction with the accompanying drawings in which.

DETAILED DESCRIPTION

Figure 1:
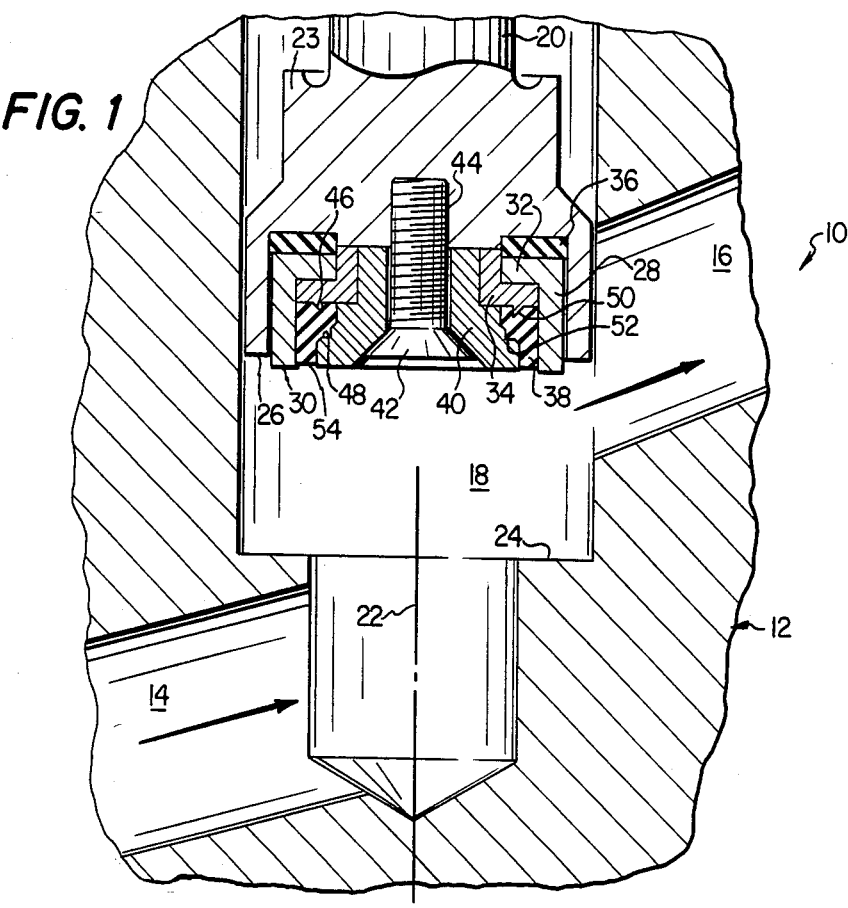
FIG. 1 is a cross sectional view of a valve forming a first embodiment of the present invention with the valve open.
Figure 3:
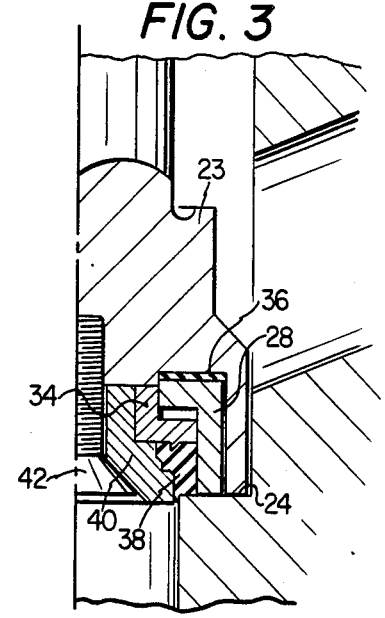
FIG. 3 is a partial cross sectional view of the valve showing the closed position of the valve with the soft seal in sealing engagement with the valve body seal surface.

With reference now to the drawings, wherein like reference numerals designate like or corresponding parts throughout the several views, and in particular to FIG. 1, there is shown a globe valve 10 forming a first embodiment of the present invention. The globe valve 10 includes a body 12 which defines an inlet passage 14, an outlet passage 16 and a flow control passage 18 which interconnects the passages 14 and 16. A valve stem 20 is illustrated within the passage 18 and is movable along the axis 22 from the open position, as seen in FIG. 1, to permit fluid flow through the passages, to the closed position, as seen in FIG. 3, to block flow between the passages. Movement of the valve stem 20 along the axis 22 is controlled by conventional structure, such as a threaded connection which moves the valve stem by rotation of a valve handle. As this structure is conventional, it is not shown or described further.

The valve body defines an annular seal surface 24 concentric with the axis 22 which forms a portion of the flow control passage 18. The valve stem 20 defines a disk 23 which has a cylindrical portion ending at a rigid annular end surface 26 concentric with the axis 22. The cylindrical portion defines a hollow interior within the walls of the cylindrical portion for mounting the various seals as described hereinafter.

A hard seal 28 is mounted on the disk 23 for limited resilient movement relative thereto along the direction of axis 22. The hard seal 28 defines an annular hard seal surface 30 which is concentric with axis 22. The outer surface of the hard seal 28 is in close proximity to the inner surface of the cylindrical portion of the disk 23 to limit any movement of the hard seal 28 relative to the disk 23, except along the axis 22. The hard seal 28 has a radially inward directed lip 32 which is confined between a hard seat retainer 34 and a resilient annular pad 36. With no forces acting on the hard seal surface 30, the resilient annular pad 36 resiliently urges the lip 32 into engagement with the hard seat retainer 34, as seen in FIG. 1, so that the hard seal surface 30 of the hard seal 28 is positioned toward the annular seal surface 24 relative to the end surface 26. As the valve is closed by moving the valve stem along axis 22 toward the seal surface 24, the hard seal surface 30 will initially contact the seal surface 24 as seen in FIG. 2.

A soft seal 38 is also mounted on the disk 23 between the hard seat retainer 34 and a soft seat retainer 40. A retainer screw 42 threadedly engages a threaded aperture 44 in the disk 23 concentric with the axis 22 to permit assembly of the valve elements. Preferably, a lip 46 is formed in the hard seat retainer 34 and a notch 48 is formed in the soft seat retainer 40 which engage corresponding notch 50 and lip 52, respectively, on the soft seal 38 to retain the soft seal.

Figure 2:
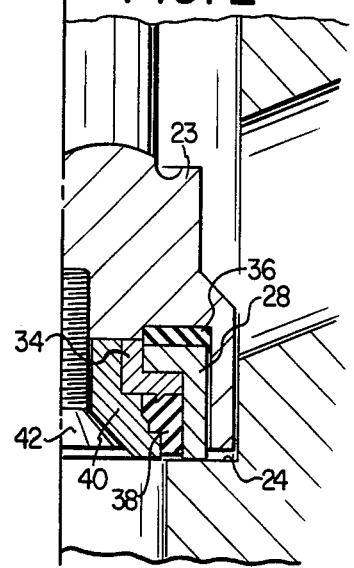
FIG. 2 is a partial cross section of the valve showing the hard seal contacting the valve body seal surface to reduce the pressure drop.

As is best illustrated in FIG. 2, as the valve stem is moved to the closed position, the hard seal surface 30 initially engages the annular seal surface 24. This hard seal reduces the flow of fluid between the inlet and outlet passages. As the valve stem moves further to the closed position, the pad 36 will compress, permitting the hard seal 28 to retract into the chamber of the cylindrical portion of the disk 23 until the soft seal surface 54 of the soft seal 38 engages the annular seal surface 24. While the seal between the hard seal 28 and seal surface 24 is not intended to be a totally fluid tight seal, it does function to reduce the flow sufficiently so that the pressure drop across the soft seal surface 54, as it engages the seal surface 24, is small enough that the soft seal does not deform or extrude between any elements of the valve which would shear a portion of the seal as the valve is closed or opened, as has been a significant problem in prior designs.

As the valve stem continues to move toward the closed position, the soft seal will be compressed between the seal surface 24, the retainers 34 and 40 and the inner surface of the hard seal 28 to form an effective fluid tight seal to prevent fluid flow between passages 14 and 16. The compression of the soft seal is limited as the rigid end surface 26 of the disk 23 will eventually engage the seal surface 24. This prevents excessive compression of the soft seal 38.

The globe valve 10 is specifically designed for use as a shut off line valve in high pressure gas service with maximum pressures of approximately 6000 psi. The valve will provide repeated bubble tight closure because the seal life is increased over prior designs by eliminating any seal shear that occurs during final closing or initial opening of the valve and significantly eliminate the tendency for seal blowout at high pressure. The pressure is balanced around the face of the soft seal due to the blocking of fluid flow by the hard seal, which also reduces fatigue and abrasion on the soft seal due to high velocity fluid flow across the seal face when the valve is open and closed, as is present in conventional soft seal globe valve designs.

While only one embodiment of the present invention has been illustrated in the accompanying drawings and described in the foregoing Detailed Description, it will be understood that the invention is not limited to the embodiment disclosed, but is capable of numerous rearrangements, modifications and substitutions of parts and elements without departing from the spirit of the invention.

We claim:

1. A valve for controlling fluid flow, the valve having a body and a valve stem for movement between an opened position permitting fluid flow through the valve and a closed position blocking fluid flow through the valve, the valve stem moving along a first axis, comprising:

a seal surface defined on the valve body concentric with the first axis and surrounding the fluid passage through the valve;

structure mounted on the valve stem having a cylindrical portion concentric with the first axis and defining an annular rigid end surface at one end of the cylindrical portion facing the seal surface on the body, the end of the cylindrical portion spaced from the seal surface on the body being closed;

a generally cylindrically shaped hard seal positioned partially within the interior of the cylindrical portion and confined by the inner walls of the cylindrical portion for limited movement along the first axis relative to the cylindrical portion, said hard seal defining an annular hard seal surface facing the seal surface of the body;

means for resiliently urging the hard seal out of the interior of the cylindrical portion along the first axis so that the hard seal surface is spaced toward the seal surface of the body relative to the rigid end surface;

means for limiting the movement of the hard seal toward the seal surface of the valve body;

a soft seal positioned partially within the chamber of the cylindrical portion concentric with the first axis and supported on its outer surface by the inner surface of the hard seal, the soft seal defining a soft seal surface extending from the chamber and positioned between the hard seal surface and the rigid end surface when the valve is open;

means for retaining the soft seal within the chamber; and the hard seal surface initially contacting the seal surface on the valve body as the valve stem is moved toward the closed position to block fluid flow through the valve and reduce the pressure drop across the soft seal to prevent extrusion of the soft seal, the resilient member being compressed and the hard seal retracting within the chamber of the cylindrical portion as the valve stem moves further to the closed position, the soft seal surface contacting the seal surface on the valve body and deforming as the valve stem is moved to the closed position with the rigid end surface in contact with the seal surface of the valve body, the soft seal and seal surface of the valve body forming a seal to block fluid flow in the closed position with the deformation of the soft seal being limited by contact between the rigid end surface and the seal surface of the valve body.

2. The valve of claim 1 comprising a globe valve.

3. The valve of claim 1 for controlling gas glow with maximum pressures of approximately 6,000 psi.

4. The valve of claim 1 wherein said soft seal is deformed against the inner wall of the hard seal.

5. The valve of claim 1 wherein said means for retaining the soft seal comprises a conically shaped soft seat retainer threadedly engaged to the valve stem by a retainer screw, said means for limiting movement of the hard seal comprising a hard seat retainer secured to the valve stem with the soft seat retainer and retainer screw.

6. The valve of claim 1 wherein said resilient means includes a resilient pad acting between the interior end of the cylindrical portion and the hard seal to urge the hard seal toward the first member, said resilient pad forming a seal between the interior end of the cylindrical portion and the hard seal.

* * * * *